(12) United States Patent
Zittlau et al.

(10) Patent No.: US 6,213,567 B1
(45) Date of Patent: Apr. 10, 2001

(54) BRAKE SYSTEM FOR A MOTOR VEHICLE AND METHOD FOR TRANSMITTING DATA IN AN ELECTRICALLY CONTROLLED BRAKE SYSTEM FOR A MOTOR VEHICLE

(75) Inventors: Dirk Zittlau, Stöckelsberg; Ulrich Deml, Lappersdorf, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/377,606

(22) Filed: Aug. 19, 1999

Related U.S. Application Data

(63) Continuation of application No. PCT/DE98/00289, filed on Feb. 2, 1998.

(51) Int. Cl.[7] ..................................................... B60T 13/66
(52) U.S. Cl. ...................... 303/20; 303/122.04; 188/158; 701/70
(58) Field of Search ..................... 303/122.04, 122.05, 303/20; 188/158, 159; 701/70, 71, 76, 78, 91, 92

(56) References Cited

U.S. PATENT DOCUMENTS

| | | | |
|---|---|---|---|
| 4,995,483 | * 2/1991 | Moseley et al. | 188/162 |
| 5,530,328 | * 6/1996 | Fernandez et al. | 701/70 |
| 5,961,190 | * 10/1999 | Brandmeier et al. | 303/20 |

FOREIGN PATENT DOCUMENTS

| | | |
|---|---|---|
| 195 09 133A1 | 10/1995 | (DE) . |
| 195 11 287A1 | 1/1996 | (DE) . |
| 195 29 434A1 | 2/1997 | (DE) . |
| 197 42 988 C1 | * 1/1999 | (DE) . |

OTHER PUBLICATIONS

Published International Application No. 97/06514 (Becker et al.), dated Feb. 20, 1997.

* cited by examiner

Primary Examiner—Robert J. Oberleitner
Assistant Examiner—Robert A. Siconolfi
(74) Attorney, Agent, or Firm—Herbert L. Lerner; Laurence A. Greenberg; Werner H. Stemer

(57) ABSTRACT

The brake system includes a pedal unit through which operations of the brake pedal of the motor vehicle are detected with one or more sensors and desired values of the brake application force are generated according the driver requirement. The system also includes electrically actuated brake actuators at the wheels of the motor vehicle. An electronic central controller evaluates the sensor signals and generates control signals for additional brake functions. Data blocks are exchanged in a predefined cyclically repeating time pattern over a data bus connecting the pedal unit, the brake actuators, and the central controller. Over an additional signal line connecting together the pedal unit, the brake actuators and the central controller, the desired value for the brake application force is transmitted from the pedal unit to the brake actuators and the central controller and data are exchanged concerning the status of the connected devices.

11 Claims, 1 Drawing Sheet

BRAKE SYSTEM FOR A MOTOR VEHICLE AND METHOD FOR TRANSMITTING DATA IN AN ELECTRICALLY CONTROLLED BRAKE SYSTEM FOR A MOTOR VEHICLE

CROSS-REFERENCE TO RELATED APPLICATION

This is a continuation of copending International Application PCT/DE98/00289, filed Feb. 2, 1998, which designated the United States.

BACKGROUND OF THE INVENTION

1. Field of the Invention

The invention belongs to the automotive arts. Specifically, the invention concerns a brake system for a motor vehicle and a method for transmitting data in an electrically controlled brake system for a motor vehicle.

The brake systems of modern motor vehicles are subject to a variety of new requirements—such as anti-locking systems ABS, drive stability systems, traction control systems, so-called intelligent cruise controllers, brake assistants, etc.—and they are subject to a demand for reduced assembly and maintenance costs, which are very considerable for present-day brake systems. These new requirements and demands, have led to the development of purely electric brake systems, which are also known as "brake-by-wire" systems. (See, for example, German published patent application DE 195 11 287 A1; and journal mot 20 (1995), p. 46).

With such electric brake systems the driver is separated from the brake in respect of the force exerted, i.e. the braking moment demanded by the driver is no longer transmitted directly as force through a hydraulic system but only as a signal over an electrical connection. The signal is used to control an electric brake actuator which by means of a source of electric power generates force at a brake which in turn produces the required braking moment through a friction element. In the case of a disk brake the force generating the braking moment through friction is designated as the brake application force.

A completely electric brake system is described, for example, in the commonly assigned, copending application No. 08/843,887, filed Apr. 17, 1997. There, the brake actuator is attached directly at the wheel of the motor vehicle in order to avoid transmitting a brake application force over long distances in the motor vehicle, while the brake controller and the detection of the braking moment demanded by the driver are arranged at a central position, for example in the vicinity of the brake pedal. Thus the brake system is distributed over the entire motor vehicle and, since the brake system forms a central safety function of the motor vehicle, stricter safety requirements must be met in respect of the electrical transmission of the braking moment demand. The transmission must be fail-safe and fault-tolerant, i.e. errors occurring during the communication must be detected reliably by the brake system and suitable strategies must be available for handling errors. In addition, all subscribers in the electrical communication process must be able to recognize faulty behavior on the part of another subscriber. In particular, a minimum braking capability must be guaranteed even if communication is interrupted.

SUMMARY OF THE INVENTION

It is accordingly an object of the invention to provide an automotive brake system and a method for transmitting data in an electrically controlled automotive brake system, which overcomes the above-mentioned disadvantages of the heretofore-known devices and methods of this general type and which offers a fail-safe and fault-tolerant brake system, in particular in respect of the communication over electrical lines.

With the foregoing and other objects in view there is provided, in accordance with the invention, a brake system for a motor vehicle, comprising:

a pedal unit with a sensor detecting an actuation of a brake pedal of the motor vehicle and generating a sensor signal with a desired value corresponding to a driver demand for a brake application force;

electrically actuated brake actuators disposed at each of a plurality of wheels of the motor vehicle;

an electronic central controller(13) evaluating the sensor signals and generating control signals for additional braking functions;

a data bus interconnecting the pedal unit, the brake actuators, and the central controller, the data bus being adapted to exchange data blocks in a predefined, cyclically repeated time pattern; and an additional signal line interconnecting the pedal unit, the brake actuators, and the central controller, the additional signal line carrying a transmission of the desired value for the brake application force from the pedal unit to the brake actuators and the central controller(13) and a data exchange concerning a status of the brake actuators.

In accordance with an added feature of the invention, the data bus is a twin-wire bus for a symmetrical transmission of digital signals and the brake actuators, the pedal unit, and the central controller forming respective nodes each having a fixed time slot with exclusive token-holding within a transmission cycle assigned thereto by a respective subscriber defined as a bus master.

In accordance with an additional feature of the invention, the sensor is one of a plurality of redundant sensors detecting a brake pedal movement and issuing sensor signals, and the pedal unit further comprises a safety circuit connected to the plurality of sensors, the safety circuit determining the driver demand as a majority decision from the sensor signals.

In accordance with another feature of the invention, the brake actuators are controllers regulating a brake application force to the desired value for the brake application force received through the bus system.

With the above and other objects in view there is also provided, in accordance with the invention, a method of transmitting data in an electrically controlled brake system for a motor vehicle, which comprises the following steps:

cyclically exchanging data over a data bus among a plurality of subscribers including a plurality of brake actuators, a pedal unit, and an electronic central controller;

defining one of the subscribers as a bus master and synchronizing all subscribers with the bus master in a global time pattern and defining within a communications cycle a fixed time slot for each subscriber to have exclusive token holding within the time slot;

dispatching with the individual subscribers data blocks containing information about a current communications cycle and the respective sender, the respective data and a checksum; and including in the data sent by the subscribers a braking moment demand of the driver and the electronic controller, measured values delivered by the sensors, and status parameters of the subscribers.

In accordance with again an added feature of the invention, a subscriber is detected as having failed if the respective subscriber fails to transmit a data block in the time slot assigned to the respective subscriber.

In accordance with again an additional feature of the invention, it is determined that a subscriber is sending in an incorrect time slot if fault symptoms appear in the "incorrect" time slot.

In accordance with again another feature of the invention, an additional signal line interconnects the pedal unit, the brake actuators, and the central controller, and a desired value for the brake application force is transmitted from the pedal unit to the brake actuators and the central controller and data are exchanged via the additional signal line concerning a status of the subscribers.

In accordance with again a further feature of the invention, the data transmission and exchange on the additional signal line is effected with pulse-width modulation.

In accordance with yet an added feature of the invention, system errors can be detected by comparing the desired values transmitted over the data bus with the desired values transmitted over the additional signal line in the case of non-active auxiliary braking functions.

In accordance with a concomitant feature of the invention, the additional signal line is an optical waveguide and signal transmission and exchange is effected through optical transmission.

The primary advantages of the invention consist particularly therein that the fail-safety and fault correction measures of the brake system are achieved with little outlay.

Other features which are considered as characteristic for the invention are set forth in the appended claims.

Although the invention is illustrated and described herein as embodied in a brake system for a motor vehicle and method for transmitting data in an electrically controlled brake system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
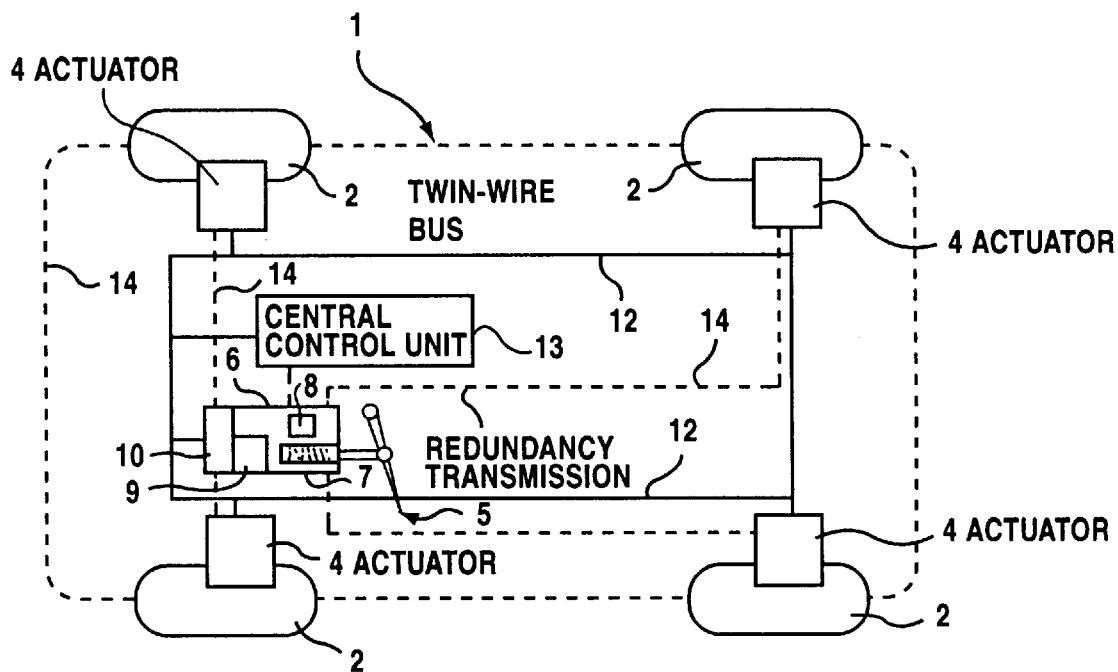
FIG. 1 is a schematic plan view of a motor vehicle with a brake system according to the invention.

Referring now to the figures of the drawing in detail and first, particularly, to FIG. 1 thereof, there is seen a motor vehicle with a brake system 1 that includes a brake at each of four wheels 2. Each of the brakes is actuated by a separate electrically controlled brake actuator 4. The brakes are operated by the driver of the motor vehicle in that the driver issues a braking moment demand over a brake pedal 5, which is connected with a pedal unit 6. The pedal unit 6 functions as a pedal force simulator and is provided with a spring 7 and with one or several force sensors and at least one displacement sensor. The sensors detect the operation of the brake pedal 5 by the driver and convert the actuation into electric signals. The sensors are represented together by a block 8. Other essential sensors that are not illustrated here are described in the above-mentioned earlier patent application 08/843,887, which is herewith incorporated by reference.

The pedal unit 6 is connected through a data bus 12 with a central controller 13 and with the brake actuators 4. The pedal unit 6 is also connected with the central controller 13 and the brake actuators 4 over an additional signal line 14 which enables a redundant transmission of control signals and data. It also connects these actuators with each other. The way in which data and signals are transmitted over the data bus 12 and the additional or redundant signal line 14 is described in the following.

In a fully electric brake system the brake actuators 4 are attached directly to each wheel 2 in order to avoid having to transmit the brake application force for the respective brake over long distances in the motor vehicle, whereas the system controller and the determination of the driver braking moment demand are positioned centrally at or in the vicinity of the brake pedal 5. As a result the brake system is distributed over the entire vehicle. The brake actuator can also generate the brake application force at the brake caliper in various ways, for example through a mechanical or a hydraulic leverage. Special safety requirements must be fulfilled for the electrical transmission of the braking moment demand in the system. This must be fail-safe and fault-tolerant, i.e. errors occurring during the transmission of data and signals (or: communication) must be detected reliably and suitable strategies must be available for handling errors. In addition, all subscribers in the communication process must be able to recognize faulty behavior on the part of another subscriber and a minimum braking capability must be guaranteed even if communication is interrupted.

A circuit and a method of communication which fulfill these requirements in a most efficient way are described below. an electric brake system the braking moment demand of the driver represents information which is transferred as an electrical signal. This information must be acquired repeatedly within a fixed time pattern by one subscriber in the communication process, the pedal unit 6, and transferred to several other subscribers in the communication process, the brake actuators 4. In addition, the data of the electronic central controller 13—which performs additional braking functions such as anti-locking system, traction control, dynamic drive control and other functions—must be communicated to the subscribers. For reasons of safety further data are also exchanged between the subscribers.

Methods of prior art for such complex communications between several subscribers use a data bus. In motor vehicles the so-called CAN bus is frequently used for this purpose. The CAN bus a standardized twin-wire bus which can transmit data between a large number of subscribers at rates of between 100 kbit and 1000 kbit. The bus is event controlled, i.e. each piece of data constitutes an event which is transmitted digitally over electrical lines in the form of a specific data block (or frame). The method of communication between the subscribers is defined and must take place in a specific form; the same applies to behavior in the event of errors. In the case of data transmission in a brake system, however, several disadvantages must be accepted since this bus represents a general concept and was not designed specifically for this task. The task to be performed in this case requires very regular communication in a fixed time pattern and for this reason an event-controlled structure is not very suitable. The so-called communications overhead (many subscribers) would also result in an enormous increase in the necessary quantity of data. In addition, it would be difficult to detect the failure of a subscriber since its communication would be linked to an event. In the case of an error an avalanche-like increase in data is possible which hinders communication considerably and can lead to delays in the processing of braking moment demands. This is a particularly important disadvantage since such a case can be avoided as part of the communications description only with difficulty but means a drastic limitation of the safety requirements. These limitations are avoided through the concept described in the following.

The driver braking moment demand is detected by means of sensors in the pedal unit 6 which replaces the conventional prior art brake pedal (which acts on a hydraulic system) as the interface to the driver. The electronic central controller or central control unit 13, which realizes the higher electronic braking functions such as anti-locking, traction control, drive dynamics. control, brake assistance, etc., forms an interface to other vehicle controllers such as the engine controller. It can be arranged anywhere in the motor vehicle. Its function can be divided among several control units or can also be dispensed with entirely for a very simple brake system.

The basic function of the brake system 1 is as follows: The pedal unit 6 detects the driver's wish to brake. From that wish, the microprocessor 9 calculates a brake application force for the brake calipers. The force must be applied by the electric actuators (this can proceed through direct generation of force or through generation of pressure). For this purpose a corresponding desired value of the brake application force must be communicated to the brake actuators 4. The brake actuator independently sets the brake application force and determines the actual value of the brake application force. The central controller 13 can modify the desired values depending on the scope of the control functions it possesses. In the case of an anti-locking system, for example, it reduces the desired value so that the respective wheel no longer locks. With a drive dynamics system the central controller independently demands desired values of the brake application force at specific wheels.

In a well-functioning brake system the following data must be exchanged between the subscribers: The braking moment demand by the driver must be transmitted to the central controller 13 and to the brake actuators 4, the desired value of the central controller 13 must be transmitted to the brake actuators, the sensor values of the brake actuators must be transmitted to the central controller 13, and data about the status of the individual subscribers must be transmitted (e.g. error data for purposes of a joint response). These values must be regularly updated within a fixed time pattern since they are the basis for diverse control processes. The update rates can be very high and according to previous experience updating frequencies between 500 and 100 Hz are necessary. Thus there is a very high density of data traffic which must satisfy the high safety requirements:

it must not be interrupted or be capable of being blocked;
it must not be subject to great delays;
it must be possible to detect errors in the data traffic rapidly and easily; and
it must be possible to detect errors at the subscribers reliably and simply.

These requirements are fulfilled as follows:

Data traffic travels over the data bus 12 which is implemented as a twin-wire bus with symmetrical transmission of binary signals (for example according to the RS 485 standard). Each of the subscribers (brake actuators 4, pedal unit 6, central controller 13) forms a node of the data bus. For reasons of safety no further token-holding nodes are connected to the bus (keeping the number of subscribers as low as possible results in a low error rate). The data traffic is not event controlled but time controlled, i.e. within a fixed cyclic sequence each subscriber is allocated a fixed time slice (or time slot) in which it holds the token. If each subscriber is allocated an equal time slice of 2 ms, for example, the complete bus communications cycle lasts 12 ms in a system with six subscribers, after which a new bus cycle begins (FIG. 2).

Figure 2:
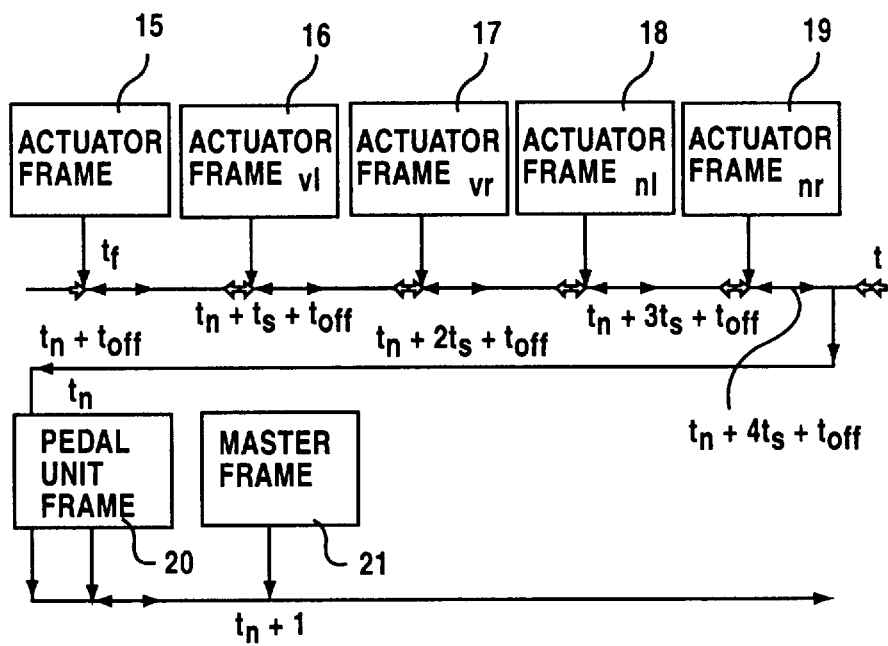
FIG. 2 is a graphical time line layout illustrating the data communication structure of the brake system according to FIG. 1.

Referring now specifically to FIG. 2, a bus master begins the bus cycle with its data block 15 or "frame," i.e. it sends in time slice number 1. The central controller 13 acts as bus master. All other subscribers respond to the dispatch of the master data block. There is a common time base: the bus master synchronizes all other subscribers to its time base. This synchronization need only be sufficiently exact that time slice division can take place reliably. Different structures are possible for the format of the data blocks whereby a standard structure is preferred for all data blocks used (of equal length) with at least the following control information: identifier byte=number of the current block, specified by the bus master and used by all subscribers during a bus cycle; address bits=give the address of the sender; check bits= checksum which is formed for the entire block according to procedures of prior art; data bytes=information contained in the block.

There is a reserve data connection over the additional signal line 1 which is used if an irreversible error occurs on the data bus. This connection is preferably implemented in the form of a pulse-width modulated data transmission which realizes only the basic braking function, i.e. transmits the measured driver requirement (braking moment demand) from the pedal unit 6 to all subscribers.

The data blocks used have a standard data structure and generally consist of twelve bytes. The first byte contains the identifier and the sender address, the second byte contains an instruction, bytes 3 to 11 contain data, and byte 12 contains the checksum.

After self-initialization the bus master begins the communication with its first data block 15. This contains an instruction for time synchronization. All subscribers synchronize on the timing of the first bit of the block. Subscribers which are ready to sent at this moment send their data block within their time slice. These are data blocks 16, 17, 18 and 19 for the brake actuators 4 for the left front wheel vl, right front wheel vr, left rear wheel hl, and right rear wheel hr respectively, and a data block 20 of the pedal unit 6. The bus cycle then begins anew with the next master data block 21 etc.

The bus master repeats the time synchronization every 50 ms and further subscribers can signal during their time slice. A subscriber which does not signal at the beginning or later frequently misses out blocks is switched off as faulty. Transmission of a block lasts approximately 1 ms and the time slice lasts 2 ms. The moment within the time slice can vary without this being evaluated as an error. A transmission outside the time slice is not permitted and is treated as a serious error.

The bus master sends the desired values of the brake application force to the individual brake actuators 4 which regulate the brake application force they generate to this desired value whereby the regulating loop of the brake actuator preferably has the same period as the data bus cycle.

In its answering block the brake actuator sends a value of the brake application force (or an equivalent measurement result) measured by it back to the bus master together with further sensor data collected at the brake actuator (e.g. wheel speed).

The brake application force is calculated in the central controller 13 from the sensor value (=driver requirement) detected in the pedal unit 6. All additional functions of the brake are implemented here as well, i.e. the braking moment demand coming from the driver is altered on the basis of the results of the electronic braking management, for example reduced in an anti-locking situation or increased in the case of traction control at the drive shaft. In addition, a new desired value for the brake application force is calculated and sent. At the same time, every subscriber observes the data traffic on the bus and responds to errors in the following way.

The driver requirement is measured in the pedal unit 6 and a braking moment demand is calculated from the sensor signals parallel to the central controller 13 by means of a safety circuit 10 which, for example, makes a 2 from 3 vote-based majority decision. This is transmitted continually to all other subscribers by PWM. As long as the desired values are not modified by the central controller (e.g. in the case of anti-locking) the desired values for the two transmissions must agree. Thus the two data connections can be tested.

The special advantage of the novel configuration lies in the fail-safety. It is possible to react simply and rapidly to all errors and without complex circuitry. In particular the special design with time slice oriented communications enables every kind of error to be detected reliably and quickly. This kind of communications is also especially suited to the task of regularly sending control data to a network of subscribers.

(1) Block errors, e.g. through EMC interference are detected through the check byte. Response: ignore the block because a new block will arrive within a short time. Even if a single false item of data is not detected in the check byte this will be overwritten by the next block.

(2) Subscribers detect internal errors. These can be reported further over the data bus 12 and the central controller can respond, for example by compensating the failure of one actuator 4 through stronger actuation of the remaining actuators.

(3) Subscriber fails without a message being issued. This can be detected through a block missing in the associated time slice. The response is the same as that described at (2).

(4) A subscriber sends in the wrong time slice. This can be detected through typical fault symptoms: there is repeatedly no block in the time slice, a different block is incomprehensible or too long. Response: resynchronize through the bus master, switch off the wrongly sending subscriber or switch over to parallel transmission.

(5) A subscriber blocks the data bus 12 through continuous sending ("babbling idiot"). This is rapidly detected through the time slices. Same response as under (4).

(6) The bus master fails or switches itself off as a result of an error detected by self diagnosis. Response: data transmission is switched over to the parallel PWM or the pedal unit 6 takes over the function of bus master. This has the considerable advantage that the central controller can be switched off without the normal braking function being lost (less redundancy in the central controller, more reliable situation for ABS, etc.). This provides reliability which meets the safety requirements of modern hydraulic brake systems.

(7) Loss of contact to one subscriber: response as under (3).

(8) Redundant transmission on signal line 14 is interrupted. Early detection is possible through comparison with the transmission on the data bus 12. Response: warning to the driver that if the bus communication fails it will not be possible to switch over to the redundant transmission.

(9) The determination of driver requirement in the pedal unit 6 is protected against error through triple sensors and the safety circuit with voter-basis decision function.

In FIG. 2 the following abbreviations are used for the communication on the data bus 12:

$t_n$: global time t; a new control cycle begins at time $t_n$.

$t_{off}$: 50 µs maximum time between the beginning of the control cycle and arrival of the master data block at the actuator=beginning of the bus cycle;

$t_s$: 2 ms period for a time slice=period between data blocks on the data bus, every node must dispatch its data block (duration tf, black double arrow) within its time slice (grey double arrow);

$t_f$: 1000 µs duration of the block transmission (black double arrow); and $t_z$: 12 ms duration of the bus cycle for six subscribers.

In summary, the advantages of the above brake system and the method for communicating the braking moment demand lies in its particular safety against faults and errors. The structure of the data communications already ensures that any faults which arise are detected reliably and quickly. This makes an adequate response possible. A single error can therefore not result in failure of the normal brake. The central controller 13 can be switched off as before without this resulting in impairment of the normal brake. The outlay is minimal in comparison with other bus systems. Although this involves a certain loss of flexibility in communications, this can be accepted in view of the fact that the particular demands of the brake system are fully met. The limited complexity also brings the additional advantage of a lowest possible error rate. This aspect is of particular importance for brake systems.

We claim:

1. A brake system for a motor vehicle, comprising:

a pedal unit with a sensor detecting an actuation of a brake pedal of the motor vehicle and generating a sensor signal with a desired value corresponding to a driver demand for a brake application force;

electrically actuated brake actuators disposed at each of a plurality of wheels of the motor vehicle;

an electronic central controller(13) evaluating the sensor signals and generating control signals for additional braking functions;

a data bus interconnecting said pedal unit, said brake actuators, and said central controller, said data bus being adapted to exchange data blocks in a predefined, cyclically repeated time pattern; and an additional signal line interconnecting said pedal unit, said brake actuators, and said central controller, said additional signal line carrying a transmission of the desired value for the brake application force from said pedal unit to said brake actuators and said central controller(13) and a data exchange concerning a status of said brake actuators.

2. The brake system according to claim 1, wherein said data bus is a twin-wire bus for a symmetrical transmission of digital signals and said brake actuators, said pedal unit, and said central controller forming respective nodes each having a fixed time slot with exclusive token-holding within a transmission cycle assigned thereto by a respective subscriber defined as a bus master.

3. The brake system according to claim 1, wherein said sensor is one of a plurality of redundant sensors detecting a brake pedal movement and issuing sensor signals, and said pedal unit further comprises a safety circuit connected to said plurality of sensors, said safety circuit determining the driver demand as a majority decision from the sensor signals.

4. The brake system according to claim 1, wherein said brake actuators are controllers regulating a brake application force to the desired value for the brake application force received through said bus system.

5. A method of transmitting data in an electrically controlled brake system for a motor vehicle, which comprises the following steps:

cyclically exchanging data over a data bus among a plurality of subscribers including a plurality of brake actuators, a pedal unit, and an electronic central controller;

defining one of the subscribers as a bus master and synchronizing all subscribers with the bus master in a global time pattern and defining within a communications cycle a fixed time slot for each subscriber to have exclusive token-holding within the time slot;

dispatching with the individual subscribers data blocks containing information about a current communications cycle and the respective sender, the respective data and a checksum; and including in the data sent by the subscribers a braking moment demand of the driver and the electronic controller, measured values delivered by the sensors, and status parameters of the subscribers.

6. The method according to claim 5, which comprises. defining a subscriber as having failed if the respective subscriber fails to transmit a data block in the time slot assigned to the respective subscriber.

7. The method according to claim 5, which comprises determining that a subscriber is sending in an incorrect time slot if fault symptoms appear in the respective time slot.

8. The method according to claim 5, which comprises providing an additional signal line interconnecting the pedal unit, the brake actuators, and the central controller, and transmitting a desired value for the brake application force from the pedal unit to the brake actuators and the central controller and exchanging data concerning a status of the subscribers via the additional signal line.

9. The method according to claim 8, wherein the transmitting and exchanging steps comprises communicating pulse-width modulated signals via the additional signal line.

10. The method according to claim 8, which comprises detecting system errors by comparing the desired values transmitted over the data bus with the desired values transmitted over the additional signal line in the case of nonactive auxiliary braking functions.

11. The method according to claim 8, wherein the additional signal line is an optical waveguide and the transmitting and exchanging steps comprise transmitting signals optically.

* * * * *